United States Patent Office 2,823,095
Patented Feb. 11, 1958

2,823,095
OXYFLUOBORATES

Norval D. Clare, Niagara Falls, N. Y., and Alden J. Deyrup, West Chester, Pa., assignors to E. I. du Pont de Nemours and Company, Wilmington, Del., a corporation of Delaware No Drawing. Application May 16, 1956
Serial No. 585,153

8 Claims. (Cl. 23—14)

This invention pertains to a new and useful reaction product containing boric oxide and an inorganic fluoride. It has as its primary objects provision of a novel water-soluble inorganic compound and aqueous solution for flameproofing and of methods for preparing the same.

This application is a continuation-in-part of our co-pending application Serial No. 469,024, filed November 15, 1954, now abandoned, which in turn was a continuation-in-part of our application Serial No. 281,685, filed April 10, 1952, and now also abandoned.

Sodium fluoride and boric oxide are two commercially available compounds long known to the chemical arts. Both have been extensively investigated, in some cases in combination. Thus, Bergman et al., Bulletin of the Academy of Sciences of U. S. S. R., No. 5, 328–337 (1943), studied fused mixtures in the binary system $NaF$—$B_2O_3$ and found that compositions containing more than 50% $B_2O_3$ do not crystallize. Abegg et al., Z. für Anorg. u. All. Chemie, 35, 129–135 (1903), studied dilute aqueous solutions, containing boric acid and the fluoride ion. These latter experimenters postulated the existence of an equimolecular ion $B_2O_3F$— in solution but failed to characterize any compounds comprising the ion. More recently Ryss et al., J. App. Chem. U. S. S. R., 25, 157–161 (1952), have investigated the mutual solubilization of sodium fluoride and boric acid.

We have found that sodium fluoride and boric oxide form a definite addition compound of the formula $NaF \cdot 1.25 B_2O_3$ or $4NaF \cdot 5B_2O_3$. This compound, which may be called an oxyfluoborate, is an anhydrous, non-crystalline, hygroscopic, water-white glass, melting reversibly over a range of temperatures at around 550°–700° C. A pourable or free-flowing liquid is obtained at about 650°–700° C. The glass is extremely soluble in water and forms therein concentrated solutions which are thick and viscous and can be drawn to fine filaments or evaporated to varnish-like films.

The oxyfluoborate forms with water a stable hydrate of the formula $4NaF \cdot 5B_2O_3 \cdot 5H_2O$. The physical properties of the hydrate are similar to those of the anhydrous compound except that it begins to soften at a lower temperature. The water of hydration begins to be lost when the hydrate is heated for any length of time at temperatures above about 110° C. and is lost completely at high temperatures. At 600° C. the water is lost fairly rapidly. The tenacity with which the water is held is, however, illustrated by the fact that it was not completely removed from a sample heated for one hour at over 600° C. If water in excess of that required by the formula is added to the hydrate, the solid tends to dissolve. The solubility of the hydrate is so great that when it is contacted with water, a single physical phase is formed. The solid may thus be said to be miscible with water.

There are several methods of preparing the oxyfluoborate or its hydrate. Perhaps the simplest is by direct addition of stoichiometric quantities of sodium fluoride and boric acid. When these materials are mixed together as dry, finely pulverized powders, and in the quantity determined by the 4:5 $NaF:B_2O_3$ mole ratio, they react upon gentle heating to form a thick solution containing 77% by weight of dissolved solids. A slight, very slow reaction is noticeable at normal room temperature, i. e., around 20° C., but has never been observed to proceed to completion. Complete reaction is obtained rapidly at 100° C. No precipitation occurs as the temperature of the solution is reduced to 20° C. The solution will actually congeal below 0° C. without precipitation.

The oxyfluoborate is also formed where non-stoichiometric quantities of sodium fluoride and boric acid are reacted. It is only necessary to separate the excess of acid or fluoride to produce the pure material. In fact, initially clear solutions are formed, in the absence of excess water, when the mole ratio of reactants is within the somewhat approximate $NaF:B_2O_3$ limits of between about 1:1.17 and 1:1.45. Both sodium fluoride and boric acid possess a slight solubility: the clarity of the solution is, therefore, probably due to the dissolving of free NaF or $B_2O_3$ along with the hydrated oxyfluoborate. Generally, solutions formed only with water liberated from the $H_3BO_3$ deposit crystals of an excess of either reactant within a short time and revert to the composition represented by the formula $4NaF \cdot 5B_2O_3 \cdot 5H_2O$.

The preferred method of forming the hydrate is by a slight variation of the process described above. In this method, dry powders of sodium fluoride and boric acid are intimately mixed in the correct stoichiometric quantities and heated under reflux at ambient pressure, most desirably with stirring. Reflux, of course, prevents the escape of excess water. The pentahydrate, however, can readily be obtained by evaporating the 77% solution to dryness at around 100–110° C. The anhydrous material can be obtained from the hydrate by heating the latter for an hour or two at around 650° C., although, as noted, water is lost very slowly from the solid at intermediate temperatures.

Another method of forming the hydrate is by gently heating sodium fluoride and boric acid in the presence of free water. If the proportions of the reactants are stoichiometrically correct, all the material will dissolve at about 10° C. Preferably, the mixture is refluxed until complete dissolution takes place.

Solutions of anomalous composition, i. e., in the 1:1.17–1:1.45 $NaF:B_2O_3$ mole ratio range but varying from the mole ratio of the oxyfluoborate, can readily be obtained by refluxing the requisite amounts of NaF and $H_3BO_3$, particularly if free water is added. The clear solutions possess some stability and the general properties of solutions of oxyfluoborate or oxyfluoborate hydrate. They can, consequently, be substituted for solutions containing precise stoichiometrical quantities of NaF and $B_2O_3$ in almost any process utilizing the latter.

A direct method of forming the oxyfluoborate is by fusing a mixture of sodium fluoride and boric oxide. At 600°–700° C. a glass will form within a very wide range of $NaF:B_2O_3$ molecular ratios. The compound with the 4:5 mole ratio formed by fusion is readily and continuously soluble in small relative quantities of water and is first recovered therefrom as the pentahydrate. If, however, the quantities of NaF and $B_2O_3$ fused together vary from the 4:5 mole ratio, the oxyfluoborate can be separated from the constituent present in excess by dissolution in a small amount of water either directly or by leaching the solid followed by filtration. The slurries initially formed by these procedures possess generally the properties of the oxyfluoborate solutions except for the presence of the solid and may be substituted for the pure solution if desired. Filtration will generally be employed since the excess solid is somewhat difficult to handle. Solutions prepared in this manner contain an excess of one constituent since both NaF and $B_2O_3$ have a slight solubility. The oxyfluoborate can, however, be recovered from such solutions in substantially pure conditions by allowing the solution to stand, filtering the precipitate, and evaporating the solution. Repeated solution and filtration can be used to obtain complete purity.

There are other methods of preparing the oxyfluoborate or its hydrate as will be evident. The preferred methods, however, are those which have been discussed.

Both sodium fluoride and boric acid are sparingly soluble compounds. Thus a saturated solution of sodium fluoride at around room temperature contains only about 4% by weight of the salt while a saturated solution of the acid contains only about 5%. The combined solubility of the fluoride and the acid at ambient temperature, ca. 20° C., is less than about 10%. Very thick, viscous solutions containing up to 77% of dissolved solids at 20° C. are readily produced by the oxyfluoborate of this invention and from them water can be continuously removed without the appearance of a crystalline phase. The interaction between boric acid or oxide and sodium fluoride thus represents a mutual solubilization quite surprising both in nature and in extent.

The reactions of the foregoing paragraphs may be summarized by the following equations:

(1) $4NaF + 10H_3BO_3 \longrightarrow 4NaF \cdot 5B_2O_3 \cdot 5H_2O + 10H_2O$ (77% Soln.)

(2) $\downarrow$ 110° C.

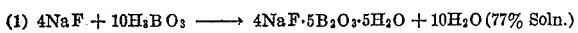
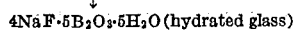
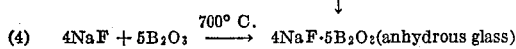

$4NaF \cdot 5B_2O_3 \cdot 5H_2O$ (hydrated glass)

(3) $\downarrow$ 600° C.–700° C.

(4) $4NaF + 5B_2O_3 \xrightarrow{700° C.} 4NaF \cdot 5B_2O_3$ (anhydrous glass)

The temperature relations between the anhydrous and hydrated compounds of this invention and between these compounds and their molecular constituents may also be summarized:

(1) Below 110° C. a reaction occurs between NaF and $H_3BO_3$ to yield the pentahydrate in solution, particularly at around 100–110° C. The excess water can be removed by evaporation but the pentahydrate remains stable at normal pressure and at temperatures up to 110° C. It is, in fact, fairly stable up to much higher temperatures;

(2) Between about 110 and 550° C. water is lost slowly from the pentahydrate, very slowly in fact until the upper part of the range is reached;

(3) At about 600° C. water is lost rapidly from the hydrate. At about 650°–700° C. the anhydrous compounds melts to a pourable liquid;

(4) Above about 700° C. dry NaF and $B_2O_3$ readily fuse to yield the anhydrous glass.

It will be readily understood that the fluorides of other alkali metals can be substituted for that of sodium in this invention. The compound formed by interaction between potassium fluoride and boric oxide or acid, for example, is much like that formed by sodium fluoride.

The compounds of this invention, especially sodium oxyfluoborate and its hydrate, are very good fireproofing agents. This usage of the materials is claimed in our copending application Serial No. 572,794, filed March 21, 1956, and the disclosure of that application is specifically incorporated by reference herein. The solutions prepared by refluxing sodium fluoride and boric acid mixtures are particularly suitable for use in fireproofing. Clear and effective solutions may be prepared with any $NaF:B_2O_3$ mole ratio in the 1:1.17–1:1.45 range. Free water may be added as desired. As noted above, slurries containing undissolved NaF or $B_2O_3$ along with the oxyfluoborate are usable but less preferred.

The invention will be understood in more detail from the examples which follow. In these examples all percentages are given in terms of weight.

EXAMPLE 1

This example shows the preferred method of forming sodium oxyfluoborate.

An intimate mixture of 168 g. (4 moles) of sodium fluoride and 618 g. (10 moles) of boric acid powder ($H_3BO_3$) was stirred and heated externally until a reflux temperature of 112° C. was reached. Stirring and refluxing at atmospheric pressure were continued for 16 hours. The resultant solution was allowed to cool to 50° C. and was then poured into suitable containers.

The solution remained stable in the containers, i. e., formed no precipitate at ambient temperatures of about 18–22° C., during a test period of three months.

(a) Part of the solution was dried by contact with the roll of a drum drier at 150° C. for about 15 seconds. The resulting solid was analyzed as follows:

|   | Percent Na | Percent F | Percent $B_2O_3$ | Percent $H_2O$ |
|---|---|---|---|---|
| Calculated for $4NaF \cdot 5B_2O_3 \cdot 5H_2O$ | 15.17 | 12.55 | 57.4 | 14.85 |
| Found | 15.17 | 12.43 | 57.8 | 12.4 |

(b) Another sample of hydrated solid prepared in the manner described under (a) was heated at 650° C. for 60 minutes. The dehydrated sample was analyzed as follows:

|   | Percent F | Percent $B_2O_3$ | Percent $H_2O$ |
|---|---|---|---|
| Calculated for $4NaF \cdot 5B_2O_3$ | 14.7 | 67.4 | 0.00 |
| Found | 13.8 | 68.4 | 0.26 |

EXAMPLE 2

This example shows the effects of varying the mole ratios of the reactants in solution.

A series of experiments was run by completely dissolving together sodium fluoride and boric acid in water in various mole ratios. In all experiments except 3 and 4, 50 g. of $H_2O$ were used for ⅓ mole of NaF. In experiments 3 and 4, the quantity of water utilized was much less than that required to dissolve either of the sparingly soluble compounds NaF and $H_3BO_3$ separately. Results are given in the Table.

Table.—Solution of $NaF \cdot H_3BO_3$ mixtures in $H_2O$

| Exp. No. | Relative Moles of Reactants | | Appearance of Solution |
|---|---|---|---|
|  | NaF | $H_3BO_3$ |  |
| 1 | 1 | 2.31 | Not quite clear. |
| 2 | 1 | 2.37 | Clear and stable during observation period. |
| 3 | 1 | 2.5 | Clear and stable indefinitely. |
| 4 | 1 | 2.56 | Clear and stable during observation period. |
| 5 | 1 | 2.72 | Clear but deposited crystals in 12 days. |
| 6 | 1 | 2.80 | Clear but deposited crystals in 2 days. |
| 7 | 1 | 2.88 | Clear but deposited crystals in 18 hours. |

EXAMPLE 3

This example illustrates the preparation of sodium oxyfluoborate by fusion. This oxyfluoborate is identical with the anhydrous compound of Example 1.

Samples of anhydrous glass were prepared by fusing a screened mixture of 73.5 g. (1.75 moles) of sodium fluoride and 152.3 g. (2.19 moles) of boric oxide ($NaF:B_2O_3$ mole ratio of 4:5) at 700° C. for 16 hours. A glass was prepared similarly by fusing a 1:1 mole ratio of sodium fluoride to boric oxide. Portions of both anhydrous melts were ball-milled to give finely divided powders which were tested for solubility in water. The composition with a mole ratio of 4:5 dissolved completely in a small quantity of water whereas the other glass with the 1:1 mole ratio remained partially insoluble in the same relative quantity.

Having described our invention, we claim:

1. An aqueous solution of a compound selected from the group consisting of $4NaF \cdot 5B_2O_3$ and the hydrates thereof.

2. The solution of claim 1 containing additionally a compound selected from the group consisting of boric acid and boric anhydride.

3. The method of preparing the compound $4NaF \cdot 5B_2O_3$ which comprises reacting sodium fluoride and a member of the group consisting of boric acid and boric anhydride, dissolving at least part of the product of the reaction in water and separating a hydrate of said compound, and removing water from the hydrate.

4. The method of preparing an aqueous solution for fireproofing fabrics and the like which comprises heating together sodium fluoride and boric acid in quantity calculated to give a $NaF:B_2O_3$ mole ratio between about 1:1.17 and 1:1.45.

5. The non-crystalline, solid, hygroscopic, and extremely and reversibly water-soluble compound having the formula $4MF \cdot 5B_2O_3$, where M is an ion of the group consisting of sodium and potassium ions.

6. A hydrate of the compound of claim 5.

7. The non-crystalline, solid, hygroscopic, and extremely and reversibly water-soluble compound having the formula $4NaF \cdot 5B_2O_3$.

8. A hydrate of the compound of claim 7.

References Cited in the file of this patent

Abegg et al.: Zeitschrift für Anorganische Chemie, vol. 35, 1903, pages 129–147.

Mellor: "A Comprehensive Treatise on Inorganic and Theoretical Chemistry," vol. 5, pages 124–125. Longmans, Green and Co., New York, 1924.

Bergmann et al.: "Bulletin of the Academy of Sciences of the USSR," 1943, pages 328–337.

U. S. DEPARTMENT OF COMMERCE
PATENT OFFICE

CERTIFICATE OF CORRECTION

Patent No. 2,823,095                              February 11, 1958

Norval D. Clare et al.

It is hereby certified that error appears in the printed specification of the above numbered patent requiring correction and that the said Letters Patent should read as corrected below.

Column 2, line 42, for "$10°$ C." read --$100°$ C.--.

Signed and sealed this 1st day of April 1958.

(SEAL)
Attest:

KARL H. AXLINE
Attesting Officer

ROBERT C. WATSON
Commissioner of Patents